T. THORP.
ROTARY GAS METER.
APPLICATION FILED JUNE 4, 1908.

910,436.

Patented Jan. 19, 1909.

4 SHEETS—SHEET 1.

WITNESSES
W. P. Burke
W. G. Smith

INVENTOR
Thomas Thorp
BY
ATTY

T. THORP.
ROTARY GAS METER.
APPLICATION FILED JUNE 4, 1908.

910,436.

Patented Jan. 19, 1909.
4 SHEETS—SHEET 3.

WITNESSES
W. P. Burke
W. G. Smith

INVENTOR
Thomas Thorp

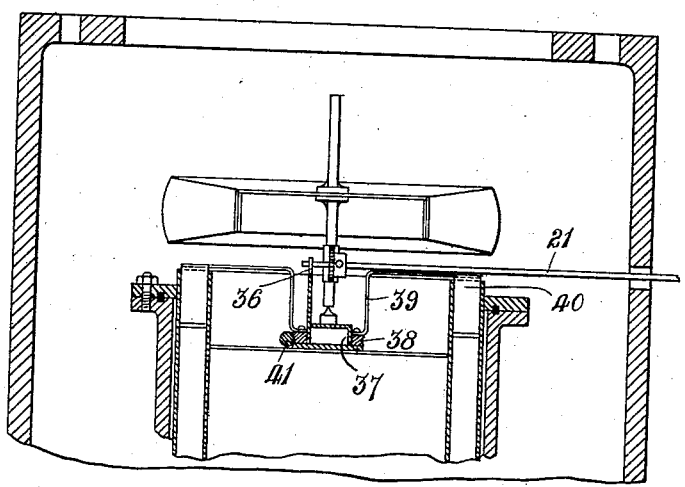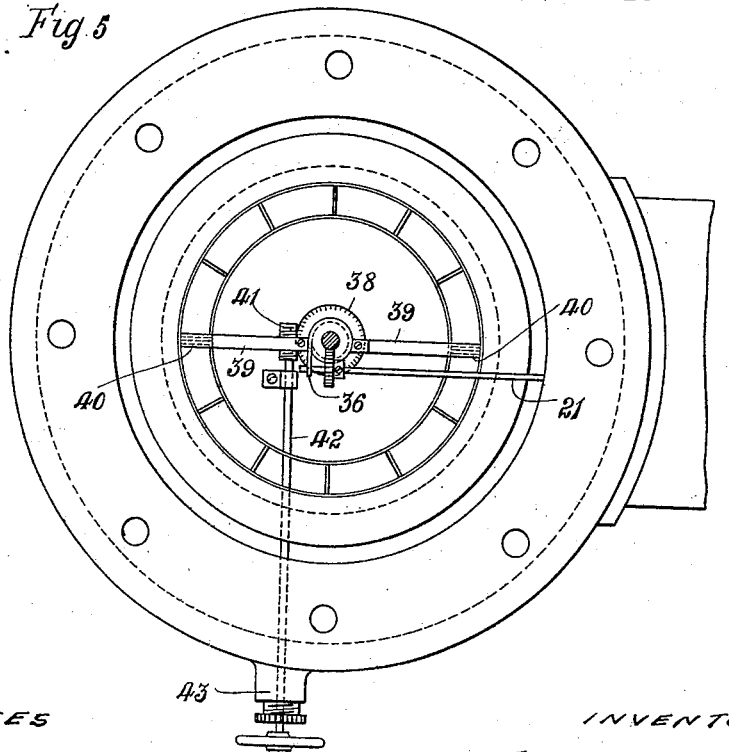

UNITED STATES PATENT OFFICE.

THOMAS THORP, OF WHITEFIELD, NEAR MANCHESTER, ENGLAND, ASSIGNOR TO ROTARY METER COMPANY, A CORPORATION OF NEW YORK.

ROTARY GAS-METER.

No. 910,436.   Specification of Letters Patent.   Patented Jan. 19, 1909.

Application filed June 4, 1908. Serial No. 436,705.

*To all whom it may concern:*

Be it known that I, THOMAS THORP, a subject of the King of Great Britain, and resident of Whitefield, near Manchester, in the county of Lancaster, England, have invented certain new and useful Improvements in Rotary Gas-Meters, of which the following is a specification.

This invention relates to the kind of gas meters described in my specifications Nos. 732,385 and 867,766 and consists in improvements thereon the object of which is to minimize the deposit of oily matter in the guide passages and to facilitate the cleaning of the same.

When such rotary meters are used for carbureted water gas, oil gas or other imperfectly washed gases, the oily matter contained therein is apt to be deposited on the walls of the tubular guide passages more or less irregularly and to choke them to such an extent, that the working of the meter and its correct registration are interfered with. The oily matter thrown off by the revolving fan wheel against the wall of the cylinder surrounding the same also was apt to interfere with its regular rotation or to arrest it, and it was found necessary in some cases to stop and clean the meters frequently, which entailed the removal of the entire internal parts and index of the same. These drawbacks are avoided in the improved meter forming the subject of the present invention.

Figure 1:
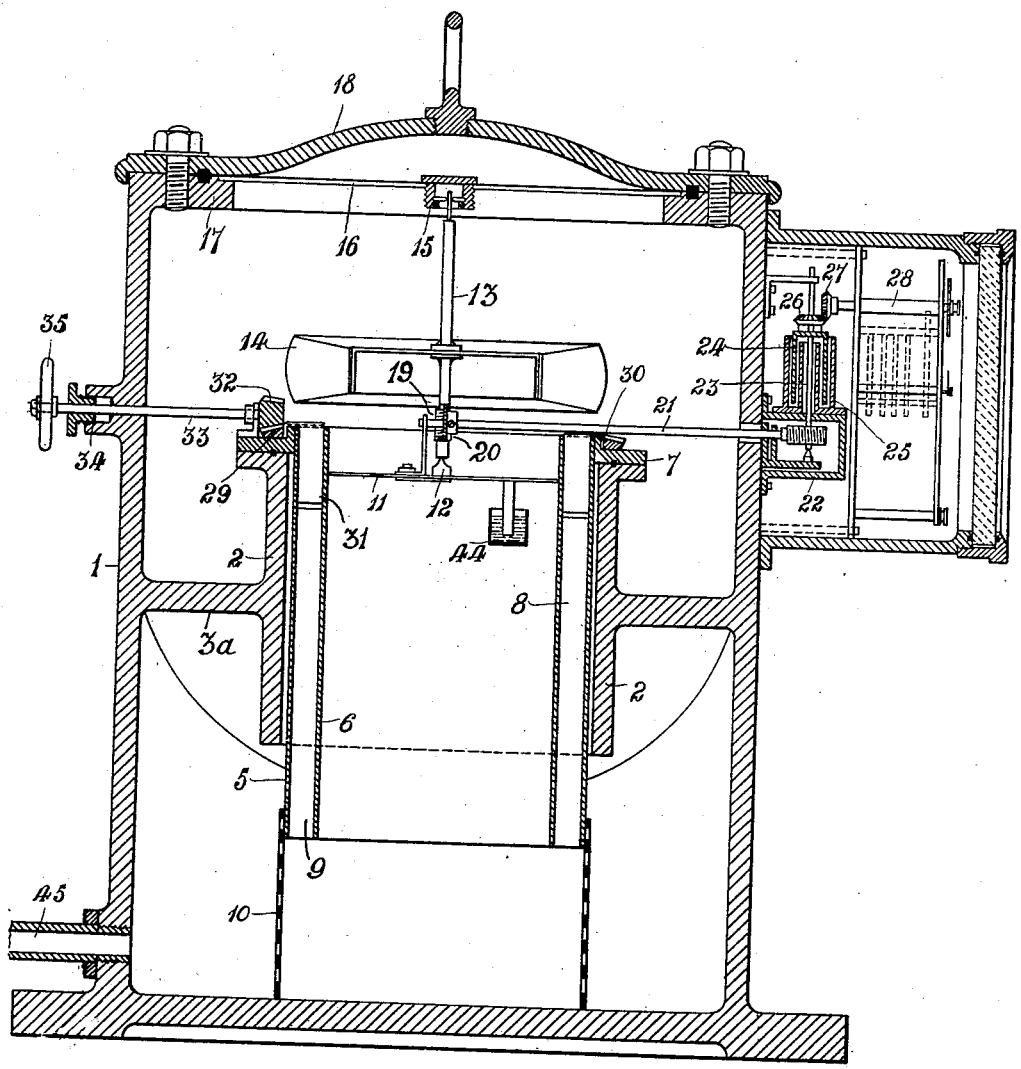
Figure 2:
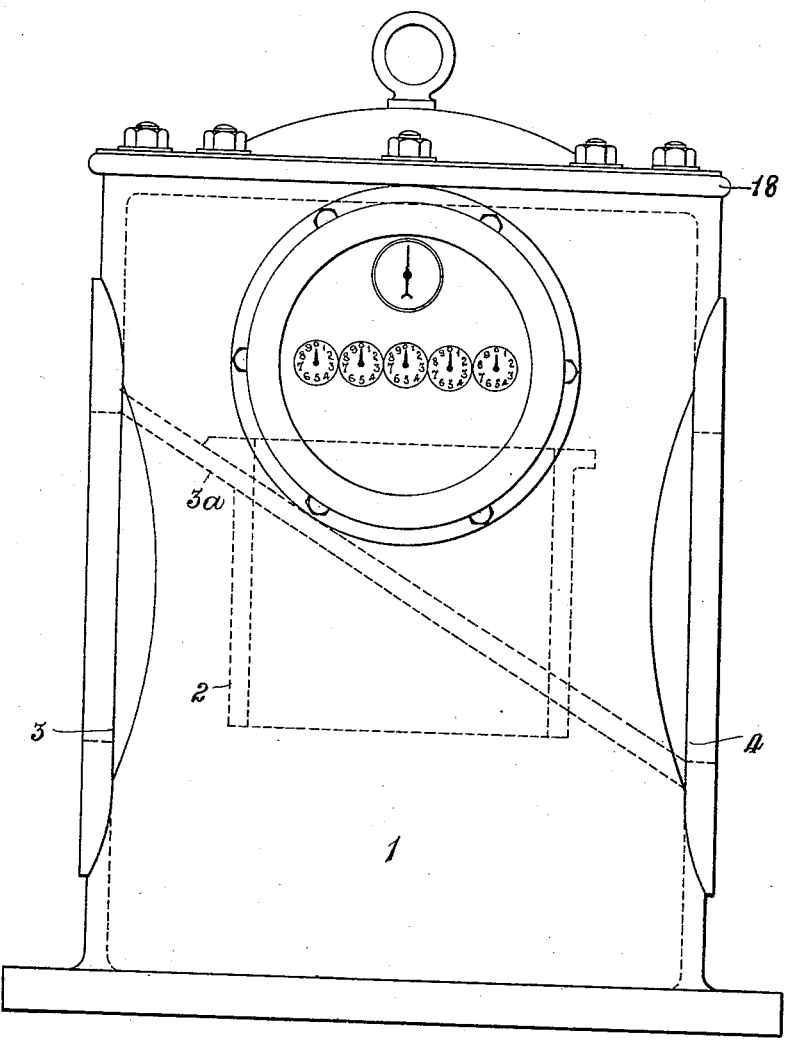
Figure 3:
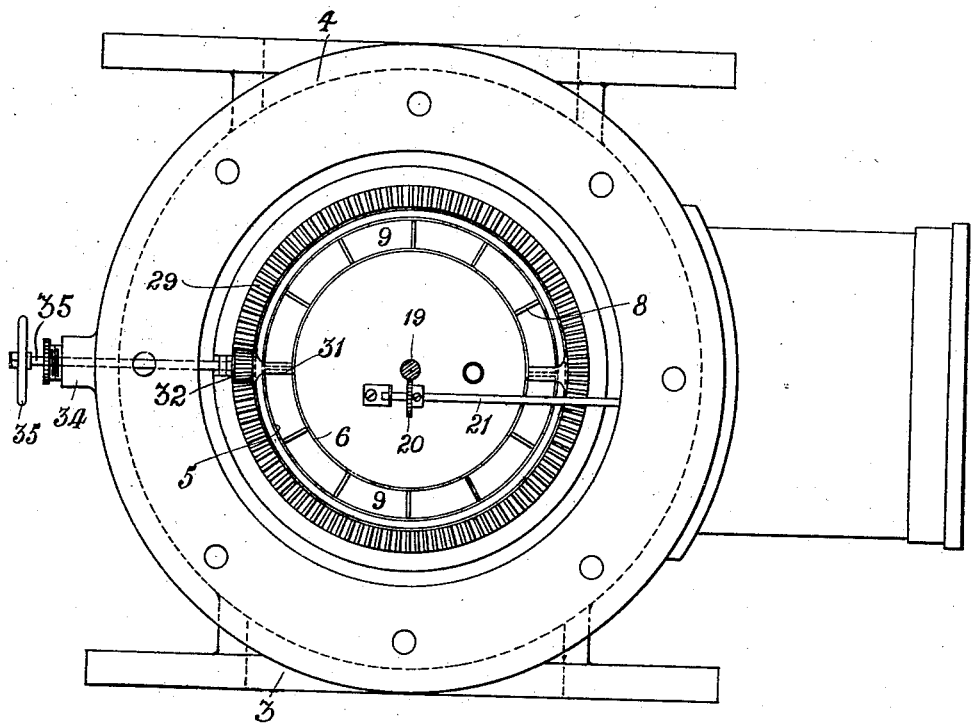

On the drawing appended hereunto, Figure 1 shows the improved meter in vertical section and Fig. 2 an outside view of the same. Fig. 3 a plan with the cover and wheel removed, Fig. 4 shows a sectional elevation and Fig. 5 a plan of a modified arrangement of scraper for the same.

The casing 1 of the meter is made in the same way as described in the specifications mentioned above, with an internal cylindrical tube 2 and an inclined partition plate 3ª dividing the inlet 3 from the outlet 4. Into the central tube 2 the two cylinders 5 and 6 are placed, the cylinder 5 being provided with a flange 7 at the top by which it is bolted to the top flange of the tube 2. The two cylinders are connected by radial webs 8 forming passages 9 for the gas. These webs reach to the bottom of the cylinders but stop short at some distance from the top, so as to leave a clear annular space between the cylinders. A perforated cylinder 10 reaches from the lower part of the cylinder 5 to the bottom of the casing. The inner cylinder 6 is closed near to its top by a plate 11, which supports the footstep 12 of the turbine or fan wheel spindle 13. The wheel is arranged above the cylinders with the centers of the blades 14 approximately above the center line of the annular space between the cylinders 5 and 6. The top bearing 15 of the spindle 13 is fixed to a bar 16 dropped with its ends into recesses of the top flange 17 of the casing and secured by the cover 18 bolted to this flange.

The registering index, instead of being arranged at the top of the cover is placed at the front of the meter casing 1. A worm 19 on the fan wheel spindle drives a worm wheel 20 on a horizontal shaft 21 that passes through the wall of the casing into a small box 22 bolted thereto and by a worm and worm wheel transmits the motion to a vertical spindle 23 to which a bell 24 is fixed which dips into mercury contained in the annular cup 25 and thereby seals the spindle. Bevel wheels 26, 27 transmit the motion to the spindle 28 of the units finger from which the other fingers of the index are actuated in the usual manner.

Preferably scrapers worked from the outside of the meter's casing are provided for scraping any deposit of oil off the walls of the annular space below the fan wheel from time to time, which scrapers may be arranged in any suitable manner.

In the arrangement shown in Figs. 1 and 3, an annular bevel wheel 29 rests on the flange 7 of the cylinder 5, which is provided with a ledge 30 fitting the bore of the wheel 29. To the latter two or more scrapers 31 are fixed, which reach down near to the top of the webs 8. A bevel pinion 32 gears with the wheel 29 and is fixed on a shaft 33, that passes through a stuffing box 34 on the casing and is provided with a handwheel 35, by means of which the wheel and scrapers can be rotated.

In the modified arrangement represented in Figs. 4 and 5, the bearing 36 for the shaft 21 actuating the index is formed on a cylinder 37, round which a worm-wheel 38 is placed to which arms 39 carrying the scrapers 40 are fixed. The worm wheel can be rotated by a worm 41 on a shaft 42, which passes through the annular space between the cylinders 5 and 6 below the scrapers, the tube 2 and a stuffing box 43 on the meter casing.

It has been found in practice that while the tubular passages hitherto used became clogged with oily matter the larger annular surfaces remained comparatively free from oily matter. In consequence the annular upper space between the cylinders 5 and 6 will only become slightly covered with the oily matter and can be kept clear by turning the scrapers round once or twice a day when taking the record of the meter. By the improved arrangement the cylinders are not connected to the top cover of the meter so that the latter can be readily removed and the fanwheel taken out, when the passages between the cylinders can be cleared out from the top by means of a rod. The great length of the wider passages insures sufficiently the vertical direction of the current through the annular space on to the vanes of the wheel. The oily matter thrown off by the latter falls outside the cylinders into the casing and is carried out through the delivery pipe. Oil collecting on the plate is drained off through a trap 44, and the oil collecting in the casing through the drain pipe 45.

I claim as my invention:

1. In rotary fan wheel gas meters the combination of a casing formed with an inlet and an outlet, a partition separating them and a tube passing through said partition, a cylinder of smaller diameter, longitudinal webs connecting this cylinder to the tube and extending to within a short distance from the top and leaving a clear annular space near to the top of the cylinder, a plate fixed in the internal cylinder, a fan wheel with vanes, the middle of the vanes being approximately above the center line of said annular space, a footstep bearing on said plate supporting the fan spindle and an upper bearing for the spindle, a cross bar supporting the said upper bearing, and a cover between which and the top of the casing the crossbar is gripped.

2. In rotary fan wheel gas meters the combination of a casing formed with an inlet and an outlet, a partition separating them and a tube passing through said partition, a cylinder of smaller diameter, longitudinal webs connecting this cylinder to the tube and extending to within a short distance from the top and leaving a clear annular space near to the top of the cylinder, a plate fixed in the internal cylinder, the middle of the vanes being approximately above the center line of said annular space, a footstep bearing on said plate supporting the fan spindle mounted on said plate and an upper bearing for the spindle, a crossbar supporting the said upper bearing, and a cover between which and the top of the casing the crossbar is gripped, a worm on the fanwheel spindle, a shaft extending to the outside of the meter casing having a worm wheel fixed thereon engaging with said worm and a register driven by the worm wheel.

3. In rotary fan wheel gas meters the combination of a casing formed with an inlet and an outlet, a partition separating them and a tube passing through said partition, a cylinder of smaller diameter, longitudinal webs connecting this cylinder to the tube and extending to within a short distance from the top and leaving a clear annular space near to the top of the cylinders, a plate fixed in the internal cylinder, a fanwheel with vanes the middle of the vanes being approximately above the center line of said annular space, a footstep bearing on said plate supporting the fan spindle and an upper bearing for the spindle, a crossbar supporting the said upper bearing, and a cover between which and the top of the casing the crossbar is gripped, a scraper entering into the said clear annular space, and means operated from the outside of the meter casing adapted to rotate the scraper round the axis of the cylinder.

4. In rotary fan wheel gas meters the combination of a casing formed with an inlet and an outlet, a partition separating them and a tube passing through said partition, a cylinder of smaller diameter, longitudinal webs connecting this cylinder to the tube and extending to within a short distance from the top and leaving a clear annular space near to the top of the cylinder, a plate fixed in the internal cylinder, a fan wheel with vanes, the middle of the vanes being approximately above the center line of said annular space, a footstep bearing supporting the fan spindle mounted on said plate and an upper bearing for the spindle, a crossbar supporting the said upper bearing, and a cover between which and the top of the casing the crossbar is gripped, an annular bevel wheel surrounding the upper end of the outer cylinder, a scraper supported by said bevel wheel and depending into the said clear annular space and a shaft extending to the outside of the meter casing and fitted with a handle at its outer end and a bevel pinion at its inner end engaging with said annular bevel wheel.

5. In rotary fan wheel gas meters the combination of a casing formed with an inlet and an outlet, a partition separating them and a tube passing through said partition, a cylinder of smaller diameter, longitudinal webs connecting this cylinder to the tube and extending to within a short distance from the top and leaving a clear annular space near to the top of the cylinder; a plate fixed in the internal cylinder, a fan wheel with vanes, the middle of the vanes being approximately above the center line of said annular space, a footstep bearing on said plate supporting the fan spindle and an upper bearing for the spindle, a crossbar supporting the said upper bearing, and a cover between which and the top of the casing the crossbar is gripped; a worm on the fanwheel spindle, a shaft extending to the outside of the meter casing having a worm wheel fixed thereon engaging with said worm and driving the register contained in a box fixed to the meter; a scraper entering into the said clear annular space, means for supporting the said scraper from above and means operated from the outside of the meter casing adapted to rotate the scraper round the axis of the cylinders.

6. In rotary fan wheel gas meters the combination of a casing formed with an inlet and an outlet, a partition separating them and a tube passing through said partition, a cylinder of smaller diameter than the tube, longitudinal webs connecting the cylinder to the tube and extending to within a short distance from the top and leaving a clear annular space near to the top of the cylinder; a plate fixed in the internal cylinder, a fan wheel with vanes, the middle of the vanes being approximately above the center line of said annular space, a footstep bearing on said plate supporting the fan spindle and an upper bearing for the spindle, a crossbar supporting the said upper bearing, and a cover between which and the top of the casing the crossbar is gripped; a worm on the fan wheel spindle, a shaft extending to the outside of the meter casing having a worm wheel fixed thereon engaging with said worm and a register driven by the worm wheel; an annular bevel wheel surrounding the upper end of the outer cylinder, a scraper supported by said bevel wheel and depending into the said clear annular space and a shaft extending to the outside of the meter casing and fitted with a handle at its outer end and a bevel pinion at its inner end engaging with said annular bevel wheel.

7. In a gas meter, the combination of two cylinders forming an annular passage for the gas, a scraper in such passage, means for supporting such scraper, driving means for moving such scraper in said annular passage about the center of the annulus, and means extending to the outside of said meter for actuating said driving means.

In testimony whereof I have hereunto set my signature in the presence of two witnesses.

THOMAS THORP.

Witnesses:
  CARL BOLLÉ,
  WILLIAM JONES.